US012662858B2

(12) United States Patent

Ohle

(10) Patent No.: US 12,662,858 B2

(45) Date of Patent: Jun. 23, 2026

(54) HATCH LOCKING DEVICE, AIR- OR SPACECRAFT HATCH AND AIR- OR SPACECRAFT

(71) Applicant: Airbus Operations GmbH, Hamburg (DE)

(72) Inventor: Sören Ohle, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 142 days.

(21) Appl. No.: 18/543,882

(22) Filed: Dec. 18, 2023

(65) Prior Publication Data

US 2024/0200374 A1 Jun. 20, 2024

(30) Foreign Application Priority Data

Dec. 19, 2022 (EP) ..................................... 22214514

(51) Int. Cl.
E05B 81/34 (2014.01)
B64C 1/14 (2006.01)
(Continued)

(52) U.S. Cl.
CPC .................. E05C 9/22 (2013.01); B64C 1/14 (2013.01); E05B 81/18 (2013.01); E05B 81/20 (2013.01);
(Continued)

(58) Field of Classification Search
CPC ............. Y10T 292/68; Y10T 292/0863; Y10T 292/0864; Y10T 292/0834;
(Continued)

(56) References Cited

U.S. PATENT DOCUMENTS

| 1,382,758 A | * | 6/1921 | Brown | ...................... E05C 5/04 |
| | | | | 292/251 |
| 1,856,091 A | * | 5/1932 | Dina | ......................... E05C 5/04 |
| | | | | 292/57 |

(Continued)

FOREIGN PATENT DOCUMENTS

| DE | 29703852 U1 | * | 4/1997 | |
| DE | 20112738 U1 | * | 11/2001 | ........... E05B 15/024 |

(Continued)

OTHER PUBLICATIONS

Extended European Search Report for EP Application No. 22214514.6 dated May 26, 2023, 5 pages.

*Primary Examiner* — Carlos Lugo
(74) *Attorney, Agent, or Firm* — Nixon & Vanderhye, P.C.

(57) ABSTRACT

A hatch locking device (100) for an aircraft or spacecraft hatch (10) including: a drivable spindle drive (101) with a longitudinal axis (X) and fixed relative to a hatch frame (11, 10) along the longitudinal axis (X); a locking bolt (102) driven by the drivable spindle drive (101) and guided along the longitudinal axis (X); and an adjustment bush assembly (110) mounted on a fuselage frame (1) and including a first eccentric bush (111) having a bolt receptacle (112) oriented centrally along the longitudinal axis (X) to receive the locking bolt (102). The hatch locking device (100) is positive-locking connectable in two axles (Y, Z) both perpendicular to the longitudinal axis (X).

16 Claims, 4 Drawing Sheets

(51) Int. Cl.
    *E05B 81/18*      (2014.01)
    *E05B 81/20*      (2014.01)
    *E05B 81/30*      (2014.01)
    *E05B 81/38*      (2014.01)
    *E05C 9/04*      (2006.01)
    *E05C 9/22*      (2006.01)

(52) U.S. Cl.
    CPC .............. *E05B 81/30* (2013.01); *E05B 81/38* (2013.01); *E05C 9/04* (2013.01)

(58) Field of Classification Search
    CPC ......... Y10T 292/0836; Y10T 292/0843; E05C 9/22; E05C 9/04; E05C 9/10; E05C 9/1808; E05B 2047/0023
    USPC ...................................................... 292/32–43
    See application file for complete search history.

(56) References Cited

U.S. PATENT DOCUMENTS

| | | | | |
|---|---|---|---|---|
| 2,071,092 A | * | 2/1937 | Troy | D06F 37/10 |
| | | | | 292/39 |
| 3,043,410 A | * | 7/1962 | Pearson | B64C 1/1415 |
| | | | | 403/322.3 |
| 3,158,217 A | * | 11/1964 | Johnson | G01G 23/02 |
| | | | | 292/144 |
| 3,396,999 A | * | 8/1968 | Knapp | E05B 47/0002 |
| | | | | 292/144 |
| 3,552,791 A | * | 1/1971 | Watermann | E05B 83/367 |
| | | | | 292/304 |
| 3,638,983 A | * | 2/1972 | Flournoy | B64C 1/1415 |
| | | | | 292/144 |
| 4,042,193 A | | 8/1977 | Cerne | |
| 4,974,888 A | * | 12/1990 | Childers | F16B 37/0857 |
| | | | | 292/342 |
| 5,280,973 A | * | 1/1994 | Culling | E05B 17/0025 |
| | | | | 292/342 |
| 5,597,187 A | * | 1/1997 | Hjorth | E05B 15/0006 |
| | | | | 292/156 |
| 6,684,671 B2 | * | 2/2004 | Beylotte | E05B 17/0029 |
| | | | | 292/201 |
| 7,014,227 B2 | * | 3/2006 | Strangward | E05C 9/10 |
| | | | | 27/DIG. 1 |
| 7,181,814 B1 | * | 2/2007 | Palmer | E05B 65/0057 |
| | | | | 27/DIG. 1 |
| 8,789,855 B2 | * | 7/2014 | Koneczny | B64C 1/1407 |
| | | | | 292/216 |
| 12,000,145 B2 | * | 6/2024 | Wang | E04G 19/003 |
| 2010/0252679 A1 | | 10/2010 | Sutthoff et al. | |
| 2022/0380016 A1 | | 12/2022 | Ohle | |

FOREIGN PATENT DOCUMENTS

| | | | | |
|---|---|---|---|---|
| DE | 202005007578 U1 | * | 9/2006 | ............. E05C 9/026 |
| EP | 1696093 A1 | * | 8/2006 | ......... E05B 65/0025 |
| KR | 200426484 Y1 | * | 9/2006 | .............. E05C 9/12 |
| KR | 102297451 B1 | * | 9/2021 | ............. E05B 63/14 |

* cited by examiner

HATCH LOCKING DEVICE, AIR- OR SPACECRAFT HATCH AND AIR- OR SPACECRAFT

RELATED APPLICATION

This application incorporates by reference and claims priority to European patent application EP 22214514.6, filed Dec. 19, 2022.

TECHNICAL FIELD

The invention relates to a hatch locking device for an aircraft or spacecraft hatch as well as to an aircraft or spacecraft hatch containing such a hatch locking device. The invention is furthermore concerned with an aircraft or spacecraft containing such an aircraft or spacecraft hatch.

BACKGROUND

Aircraft doors in a fuselage cell of an aircraft must transfer considerable peripheral loads. The greater the diameter of a fuselage cell the higher the peripheral loads which arise in the fuselage cell structure. The load transfer between the aircraft door and the fuselage cell structure is commonly provided through a multiple of hooks swivel mounted on a shaft which engage round substantially horizontally fixed shaft sections in the area of the fuselage cell.

High tensile forces act during the flight, in particular, in the case of relatively large aircraft doors or hatches, such as cargo hold hatches, for example. In addition, high load differences, for example in comparison between an unloaded and loaded cargo hold, can lead on ground to deformations or deflections occurring in the region of the hatch gaps, which deformations or deflections can impair the correct orientation of the hatch locking elements with respect to one another.

SUMMARY

Aspects of the invention may provide solutions for improving locking and securing of aircraft or spacecraft doors under different loads.

According to a first aspect of the invention, a hatch locking device for an aircraft or spacecraft hatch is provided. The hatch locking device comprises a drivable spindle drive which extends in a longitudinal axis and is fixed in relation to a hatch frame of the aircraft or spacecraft hatch along the longitudinal axis. Furthermore, the hatch locking device comprises at least one locking bolt which is driven by the drivable spindle drive and is guided along the longitudinal axis and at least one adjustment bush assembly being mounted on a fuselage frame. The at least one adjustment bush assembly comprises a first eccentric bush having a bolt receptacle which is oriented centrally along the longitudinal axis for receiving the at least one locking bolt such that the hatch locking device is positive-locking connectable in two axles both being perpendicular to the longitudinal axis.

According to a second aspect of the invention, an aircraft hatch or a spacecraft hatch comprising a hatch frame and a hatch locking device according to the invention is provided. The hatch locking device is mounted to the hatch frame, wherein the drivable spindle drive is fixed in relation to the hatch frame along the longitudinal axis. Furthermore, the aircraft hatch or the spacecraft hatch comprises a drive unit which is mounted to the hatch frame and drives the drivable spindle drive.

According to a third aspect of the invention, an aircraft or spacecraft comprising an aircraft hatch or a spacecraft hatch according to the invention is provided.

A fundamental concept of the invention is to provide a bolt closure for an aircraft hatch, which bolt closure can have a positive-locking connection in at least two directions as well as one-way in a third direction, in particular in Y- and Z-direction as well as in +X-direction. That means in X-direction the positive-locking connection can only be provided in pushing direction of the locking bolt to the adjustment bush assembly. Moreover, the bolt closure can transmit forces in X-, Y- and Z-direction and torques, or also called moments, in Y- and Z-direction in case of movement of the aircraft or spacecraft hatch in relation to the fuselage frame by loads during flight, for example, or in case of self-centering during a locking process in case of misalignment caused by loading differences, for example. Furthermore, the spindle drive and the adjustment bush assembly can be mounted reversely.

A particular advantage in the solution according to an aspect of the invention is that manufacturing tolerances of the hatch panel and/or the hatch frame can be compensated for translationally in all directions by the adjustable bush assembly; the hatch locking device makes self-centering of the hatch during closure and self-centering of the locking bolt during locking possible by the conical bush reception. In addition, one particular advantage results from the screw drive actuation which has high power and increases the reliability of the locking and unlocking.

Moreover, the drivable spindle drive is self-securing.

Advantageous embodiments and further developments emerge from the description with reference to the figures.

According to some aspects of the hatch locking device according to the invention, the at least one locking bolt comprises two opposing locking bolts which are driven by the drivable spindle drive and are guided along the longitudinal axis, and wherein the at least one adjustment bush assembly comprises two adjustment bush assemblies each being mounted on a fuselage frame. Both locking bolts are driven by the drivable spindle drive simultaneously. Therefore, one of the two locking bolts can comprise a left-hand thread, wherein the other locking bolt can comprise a right-hand thread.

According to some further aspects of the hatch locking device according to the invention, the two adjustment bush assemblies are configured to receive the two opposing locking bolts such that the hatch locking device is positive-locking connectable in the longitudinal axis. Thus, the hatch locking device can have a positive-locking connection in all directions, in particular in X-, Y- and Z-direction, wherein the longitudinal axis represents the X-direction. The hatch locking device cannot pop out of a locked position.

According to some further aspects of the hatch locking device according to the invention, an end region of the at least one locking bolt is encased in a bolt bush, wherein the bolt bush slides inside the drivable spindle drive for supporting the at least one locking bolt against a torque perpendicular to the longitudinal axis. Higher torques can be withstood thereby. The end region of the at least one locking bolt provides a higher leverage to the hatch frame than the thread of the drivable spindle drive.

According to some further aspects of the hatch locking device according to the invention, the at least one adjustment bush assembly further comprises a second eccentric bush which partly surrounds the first eccentric bush on its outer surface, wherein the first eccentric bush and the second eccentric bush each basically comprise a same axle offset. Thus, the axle offset of each eccentric bush can be combined to provide many different positions for the bolt receptacle to receive the locking bolt in case the longitudinal axis of the hatch locking device is offset to the longitudinal axis of the adjustment bush assembly. Furthermore, in case the longitudinal axis of the hatch locking device corresponds to the longitudinal axis of the adjustment bush assembly, the first eccentric bush and the second eccentric bush both having the same axle offset can be balanced out such that the axle offset provided by the first eccentric bush is compensated by the axle offset of the second eccentric bush.

According to some further aspects of the hatch locking device according to the invention, the second eccentric bush has a conical shape and comprises teeth on a front side for rotating the second eccentric bush in relation to the first eccentric bush, wherein the at least one adjustment bush assembly further comprises a nut interacting with the first eccentric bush for pressing the second eccentric bush between the first eccentric bush and the fuselage frame. Thus, the conical shape can increase the axial load capability. The radial preload prevents the adjustment bush assembly from rotating as a result of the torque caused by the transverse force and eccentricity or as a result of the friction between the locking bolt and the first eccentric bush. Hence, a continuous adjustment of the offset of the first eccentric bush and the second eccentric bush can be provided. The centric recess of the second eccentric bush assist to rotate the second eccentric bush in relation to the first eccentric bush. Furthermore, an axial adjustment of the locking bolt in relation to the first eccentric bush can be provided by a selection of the first eccentric bush with an appropriate inner diameter.

According to some further aspects of the hatch locking device according to the invention, wherein the at least one adjustment bush assembly further comprises a shim washer for adapting a distance between the at least one locking bolt and the first eccentric bush along the longitudinal axis.

According to some further aspects of the hatch locking device according to the invention, the first eccentric bush is configured as a serrated, conical eccentric bush and comprises teeth on a front side for avoiding a rotation of the serrated, conical eccentric bush in relation to the fuselage frame. That means the first eccentric bush has an outer conical shape and comprises teeth on a front side for avoiding a rotation in relation to the second conical bush whereby the second conical bush is rotationally fixed in relation to the fuselage frame by serration. Furthermore, an axial adjustment of the locking bolt in relation to the first eccentric bush can be provided by a selection of the first eccentric bush with an appropriate inner diameter.

According to some aspects the aircraft or spacecraft hatch according to the invention comprises at least two hatch locking devices, wherein at least one hatch locking device comprises two opposing locking bolts and wherein at least one hatch locking device comprises one locking bolt. The hatch locking device with one locking bolt can be arranged at a lateral side of the aircraft or spacecraft hatch, wherein the lateral side extends along the orientation of the fuselage frame. The hatch locking device with two locking bolts can be arranged at a horizontal side of the aircraft or spacecraft hatch, wherein the horizontal side extends perpendicular to the orientation of the fuselage frame. Therefore, the hatch locking device with two locking bolts can be arranged in relation to the fuselage frame such that both adjustment bush assemblies can be supported by two fuselage frames, one fuselage frame being on each side.

According to some further aspects the aircraft or spacecraft hatch according to the invention further comprises a drive system which mechanically couples the drive unit with the hatch locking device, wherein the drive system comprises at least one of the following: a main drive shaft, a drive belt or a worm drive. Thus, the drive unit does not need to be arranged next to the hatch locking device. In particular when the aircraft hatch comprises more than one hatch locking device the drive system can couple each hatch locking device to the drive unit.

According to some further aspects the aircraft or spacecraft hatch according to the invention further comprises a pull-in device for forcing the aircraft or spacecraft hatch to close, wherein the pull-in device comprises a hollow cam disc which is mechanically coupled to the drive system and configured to interact with a pin being mounted on a fuselage frame. Due to different loading conditions the aircraft or spacecraft hatch might not close completely without assistance. Instead small gaps between the fuselage frame and the aircraft or spacecraft hatch can remain such that the locking bolt cannot be received in the first eccentric bush. In particular, the pull-in device can be used when the small gaps have a distance from the pin to the hollow cam disc of 50 mm or less, or 40 mm or less. In other words, the pull-in device can be used when the misalignment between the pin and the hollow cam disc is 50 mm or less. Therefore, the pull-in device is configured to interact with the pin to completely close the aircraft or spacecraft hatch and to align the locking bolt to the bolt receptacle of the first eccentric bush.

According to some further aspects of the aircraft or spacecraft hatch according to the invention, the pull-in device further comprises a planetary gear arranged between the hollow cam disc and the drive system for synchronizing the rotation of the hollow cam disc and the rotation of the drivable spindle drive such that the aircraft or spacecraft hatch is at least almost closed before the bolt receptacle receives the locking bolt. The planetary gear increases the torque and hence the pull-in force.

According to some aspects of the aircraft or spacecraft according to the invention, the aircraft or spacecraft hatch is configured as a cargo hold hatch.

SUMMARY OF DRAWINGS

The present invention is explained more specifically below on the basis of the exemplary embodiments indicated in the schematic figures, in which:

FIGS. 4A and 4B show a schematic illustration of an aircraft hatch with a pull-in device according to a further embodiment of the invention, wherein FIG. 4A shows the pull-in device in a starting condition and FIG. 4B shows the pull-in device in a final condition;

Figure 1:
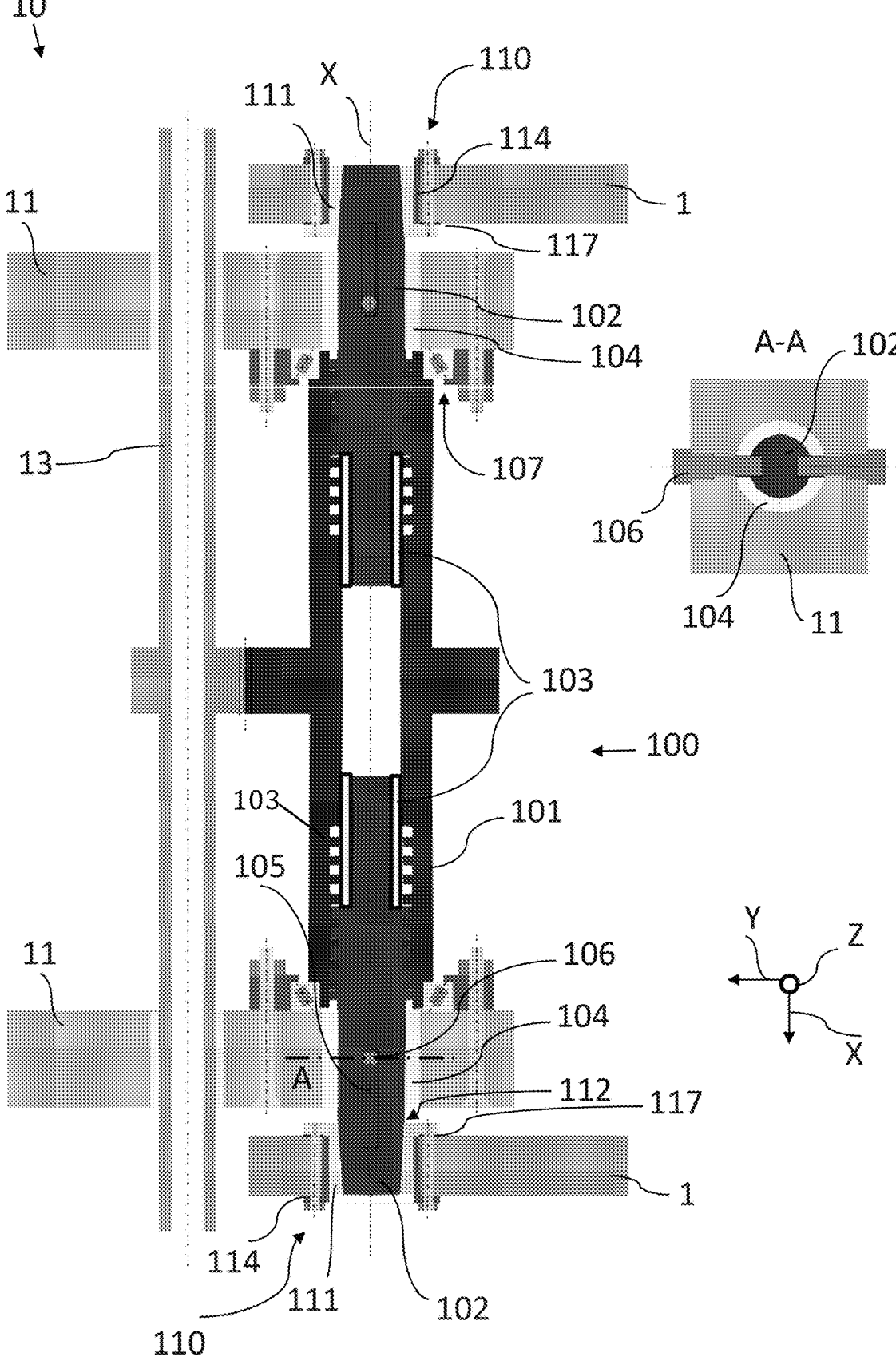
FIG. 1 shows a schematic illustration of a hatch locking device with two opposing locking bolts in a locked condition according to an embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

DETAILED DESCRIPTION

FIG. 1 shows a schematic illustration of a hatch locking device 100 with two opposing locking bolts 102 in a locked condition. In the illustrated locked condition, the hatch locking device 100 is integrated in an aircraft hatch 10 and locked to a fuselage frame 1.

The hatch locking device 100 comprises a drivable spindle drive 101 which extends in a longitudinal axis X. The drivable spindle drive 101 is fixed in relation to a hatch frame 11 of the aircraft hatch 10 along the longitudinal axis X. In particular, the drivable spindle drive 101 is arranged between two adjacent hatch frames 11. Thereby, the drivable spindle drive 101 is mounted to the two adjacent hatch frames 11 by means of a roller bearing 107, which is supported by the hatch frame 11. The roller bearing 107 may be tapered. Furthermore, the drivable spindle drive 101 comprises a spur gear which is engaged with a drive system 13 of the aircraft hatch 10. In FIG. 1, the drive system 13 comprises a spur gear configured to be engaged with the spur gear of the drivable spindle drive 101, for example.

Further, the hatch locking device 100 comprises the two opposing locking bolts 102 which are driven by the drivable spindle drive 101. A head region of the two locking bolts 102 contains a conical shape. The two opposing locking bolts 102 are guided along the longitudinal axis X. For driving the two opposing locking bolts 102 the drivable spindle drive 101 is rotated about the longitudinal axis X. Therefore, one of the two locking bolts 102 contains a left-hand thread, wherein the other locking bolt 102 contains a right-hand thread 103. For example, the downwards oriented locking bolt 102 contains the left-hand thread and the upwards oriented locking bolt 102 contains the right-hand thread, as it is illustrated in FIG. 1. Furthermore, the drivable spindle drive 101 is self-securing, which means the locking bolts 102 are not able to drive the drivable spindle drive 101. Optionally, the drivable spindle drive 101 comprises a trapezoidal inner thread and the two locking bolts 102 comprise a corresponding trapezoidal outer thread.

Additionally, the hatch locking device 100 comprises two adjustment bush assemblies 110 each being mounted on the fuselage frame 1. The two adjustment bush assemblies 110 are configured to receive the two opposing locking bolts 102 such that the hatch locking device 100 is positive-locking connectable in the longitudinal axis X and in two axles Y, Z both being perpendicular to the longitudinal axis X.

Each adjustment bush assembly 110 comprises a first eccentric bush 111. The first eccentric bush 111 contains a bolt receptacle 112 which is oriented centrally along the longitudinal axis X for receiving the locking bolt 102 such that the hatch locking device 100 is positive-locking connectable in all directions, i.e. the axis X, Y and Z. The bolt receptacle 112 has a conical shape corresponding to the conical shape of the locking bolt 102. In this embodiment, the first eccentric bush 111 contains a cylindrical shell surface, but is not limited to such a shape.

Moreover, each adjustment bush assembly 110 comprises a second eccentric bush 114. The second eccentric bush 114 partly surrounds the first eccentric bush 111 on its outer surface. The first eccentric bush 111 and the second eccentric bush 114 may each basically comprise a same axle offset.

Each adjustment bush assembly 110 further comprises a shim washer 117 for adapting a distance between the at least one locking bolt 102 and the first eccentric bush 111 along the longitudinal axis X. For example, the adjustment bush assembly 110 includes at least one fastening screw for fastening the adjustment bush assembly 110 or the first eccentric bush 111 at the fuselage frame 11. The fastening screw is oriented parallel to the longitudinal axis X. By varying a thickness of the shim washer 117 the first eccentric bush 111 can be positioned closer to or further away from the locking bolt 102. At an installation of the hatch locking device 100 the thickness of the shim washer can be chosen such that the two opposing locking bolts 102 are received in the first eccentric bushes 111 basically at the same time. That means depending on manufacturing tolerances of the fuselage frame 1 and the hatch frame 11, respectively, the shim washer 117 compensates a distance along the longitudinal axis X.

Furthermore, axial forces are transferred by the conical shape of the locking bolt 102 via the drivable spindle drive 101 and via the tapered roller bearing 107 to the hatch frame 11. Alternatively or additionally, the two opposing locking bolts 102 are arranged between two adjacent hatch frames 11.

Further, an end region of the locking bolt 102 can be encased in a bolt bush 103, as illustrated in FIG. 1. The bolt bush 103 can slide inside the drivable spindle drive 101 for supporting the locking bolt 102 against a torque perpendicular to the longitudinal axis X.

The hatch frame 11 may house a hatch bush 104 which is penetrated by the slidable locking bolt 102. In particular, the hatch bush 104 is fixed in relation to the hatch frame 11.

Optionally, the locking bolt 102 comprises a groove 105 oriented along the longitudinal axis X for securing the locking bolt 102 against rotation around the longitudinal axis X. Thereby, a bolt or a pin 106 causes a positive-locking connection between the locking bolt 102, the hatch bush 104 and the hatch frame 11 when being inserted into the groove 105 through the hatch bush 104 and the hatch frame 11, as it is illustrated in view A-A in FIG. 1.

Figure 2:
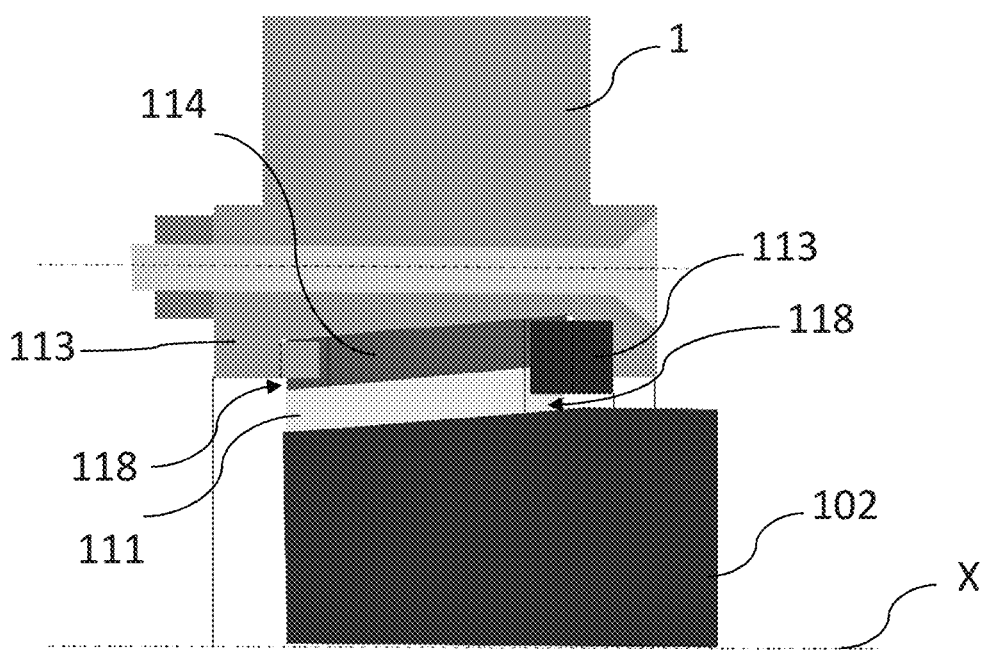
FIG. 2 shows a schematic illustration of an adjustment bush assembly of a hatch locking device according to a further embodiment of the invention.

FIG. 2 shows a schematic illustration of an adjustment bush assembly 110 of a hatch locking device 100.

The adjustment bush assembly 110 of FIG. 2 differs from the adjustment bush assembly of FIG. 1 in that the first eccentric bush 111 is configured as a serrated, conical eccentric bush. The first serrated, conical eccentric bush 111 comprises teeth 118 on a front side of the serrated, conical eccentric bush 111 for avoiding a rotation of the serrated, conical eccentric bush 111 in relation to a fuselage frame 1.

Further, the second eccentric bush 114 is configured as serrated, conical eccentric bush. The second serrated, conical eccentric bush 114 comprises teeth 118 on a front side and on a back side of the serrated, conical eccentric bush 114.

The first serrated, conical eccentric bush 111 and the second serrated, conical eccentric bush 114 are oriented along the longitudinal axis X.

The teeth 118 are arranged circumferential around the first serrated, conical eccentric bush 111 and the second serrated, conical eccentric bush 114, respectively. The first serrated, conical eccentric bush 111 and the second serrated conical eccentric bush 114 are mounted to the fuselage frame 1 by means of a serrated plate 113. The serrated plate 113 contains corresponding teeth 118 for engaging with the teeth 118 of the eccentric bushes 111, 114. Thereby, the teeth 118 may be configured to provide a small adjustable rotation step of the first serrated, conical eccentric bush 111 in relation to the serrated plate 113 and of the second serrated, conical eccentric bush 114 in relation to the serrated plate 113. The serrated plate 113 can be mounted to the first eccentric bush 111 and axially fixed by a plate mounted to the fuselage frame 1 by means of a fastening screw or the like. For example, the serrated plate 113 on the left-hand side can be screwed to the fuselage frame 1. Then the second serrated conical eccentric bush 114 can be mounted to the fuselage frame 1. After that, the serrated plate 113 on the right-hand side can be mounted interacting with the second serrated conical eccentric bush 114. Finally, the first serrated, conical eccentric bush 111 can be mounted interacting with the serrated plate 113 on the right-hand side in FIG. 2.

For example, a bore of the fuselage frame 1 in which the adjustment bush assembly 110 is mounted is reference for interlocking of the fuselage frame 1 and the second serrated, conical eccentric bush 114. The bore in the second serrated, conical eccentric bush 114 is reference for interlocking of the first and second serrated, conical eccentric bush 111, 114 and the serrated plate 113 on the left-hand and the right-hand side.

The locking bolt 102 is receivable in the bolt receptacle of the first serrated, conical eccentric bush 111.

Figure 3:
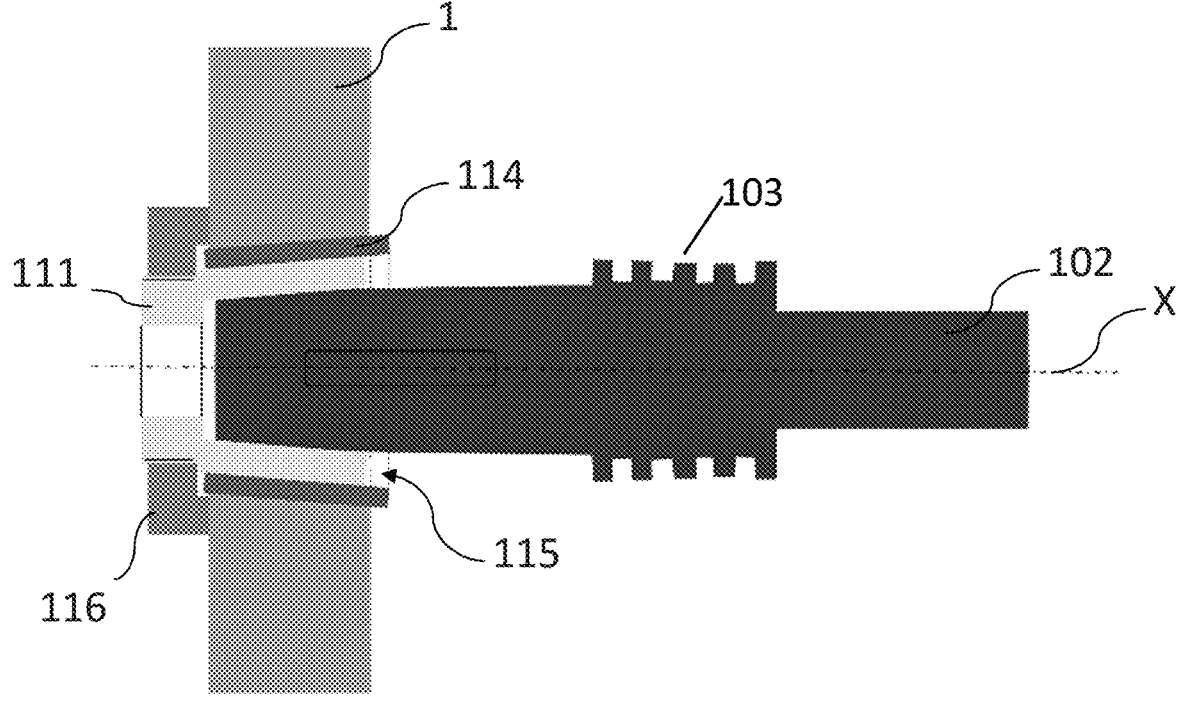
FIG. 3 shows a schematic illustration of another adjustment bush assembly of a hatch locking device according to a further embodiment of the invention.

FIG. 3 shows a schematic illustration of another adjustment bush assembly 110 of a hatch locking device 100.

The adjustment bush assembly 110 of FIG. 3 differs from the adjustment bush assembly of FIG. 1 in that the second eccentric bush 114 has a conical shape. Furthermore, the second eccentric bush 114 comprises teeth 115 on a front side of the second eccentric bush 114 for rotating the second eccentric bush 114 in relation to the first eccentric bush 111. The teeth 115 are arranged circumferential around the second eccentric bush 114.

Optionally, the adjustment bush assembly 110 further comprises a nut 116 interacting with the first eccentric bush 111 for pressing the second eccentric bush 114 between the first eccentric bush and a fuselage frame 1.

For countering the nut 116 the first eccentric bush 111 contains a polygon socket, in particular a hexagon socket.

The first eccentric bush 111 and the second eccentric bush 114 are oriented along the longitudinal axis X.

The locking bolt 102 is receivable in the bolt receptacle of the first eccentric bush 111.

Figure 4A:
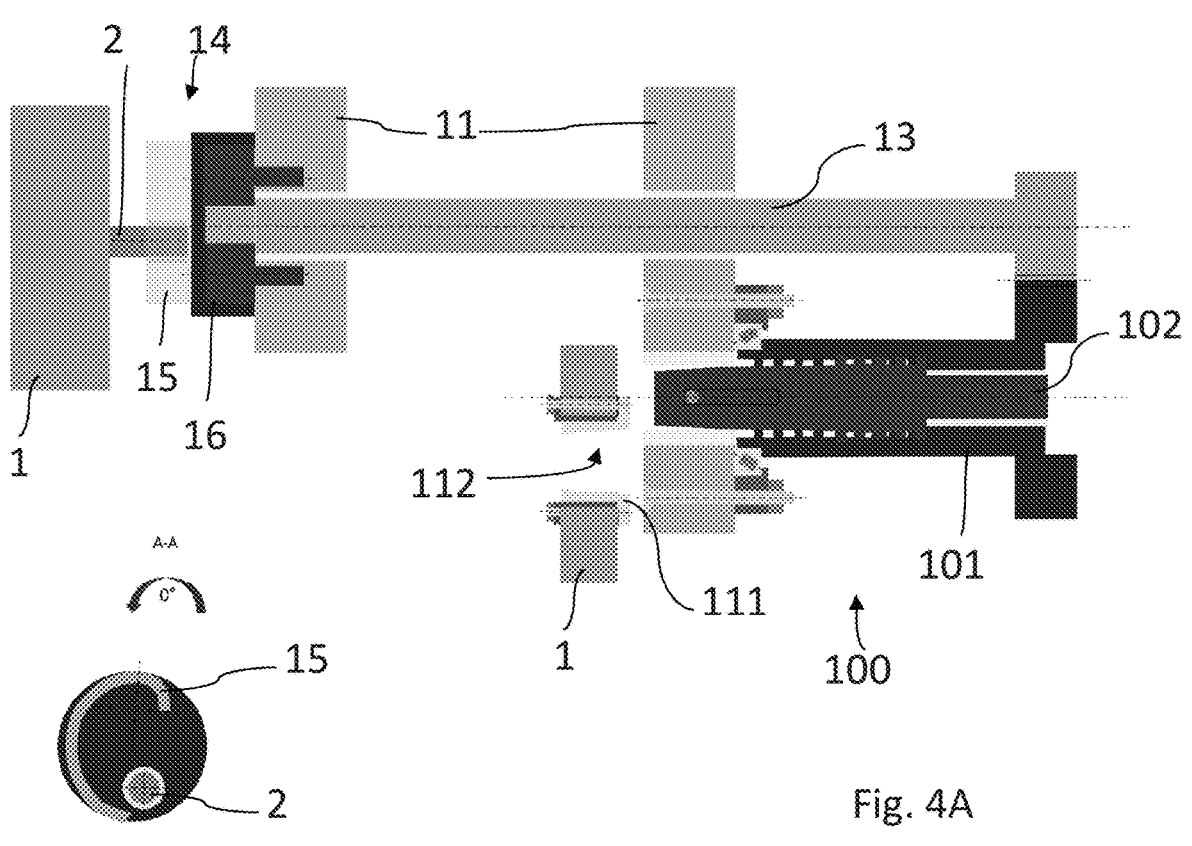
Figure 4B:
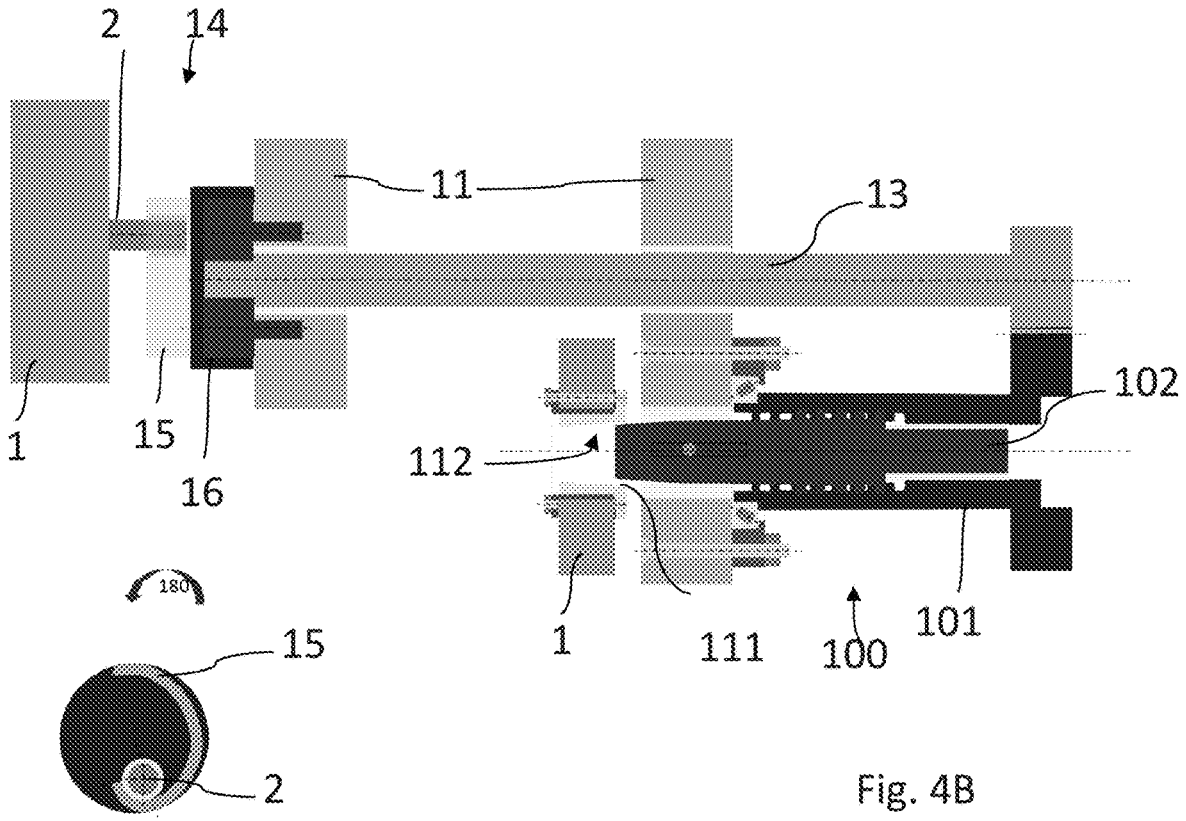

FIGS. 4A and 4B show a schematic illustration of an aircraft hatch 10 with a pull-in device 14, wherein FIG. 4A shows the pull-in device 14 in a starting condition and FIG. 4B shows the pull-in device 14 in a final condition.

The aircraft hatch 10 comprises a hatch frame 11, a hatch locking device 100, a drive unit 12 and a drive system 13.

The hatch locking device 100 is mounted to the hatch frame 11. A drivable spindle drive 101 of the hatch locking device 100 is fixed in relation to the hatch frame 11 along the longitudinal axis X.

The drive unit 12 (not shown in FIG. 4A, 4B) is mounted to the hatch frame 11 and drives the drivable spindle drive 101.

The drive system 13 mechanically couples the drive unit 12 with the hatch locking device 100. Therefore, the drive system 13 comprises a main drive shaft.

The pull-in device 14 is configured to force the aircraft hatch 10 to close. Thereby, the pull-in device 14 comprises a hollow cam disc 15. The hollow cam disc 15 is mechanically coupled to the drive system 13 and configured to interact with a pin 2 mounted on a fuselage frame 1.

Further the pull-in device 14 comprises a planetary gear 16. The planetary gear 16 is arranged between the hollow cam disc 15 and the drive system 13 for synchronizing the rotation of the hollow cam disc 15 and the rotation of the drivable spindle drive 101 such that the aircraft hatch 10 is at least almost closed before the bolt receptacle 112 receives the locking bolt 102.

In the starting condition the hollow cam disk 15 is configured to come in close vicinity of the pin 2. The longitudinal axis X of the hatch locking device 100 is offset to a longitudinal axis of the first eccentric bush 111, wherein the offset is more than an offset which can be fixed by self-centering of the conical locking bolt 102. Therefore, the locking bolt 102 is not able to be driven into the bolt receptacle of the first eccentric bush 111. The drive system 13 is in a reference position having an angle of 0° of a rotational axis, as it is illustrated in FIG. 4A.

Between the starting condition and the final condition the hollow cam disk 15 engages behind the pin 2 and pulls the aircraft hatch 10 towards the fuselage frame 1.

In the final condition of the pull-in device 14 the longitudinal axis X of the locking bolt 102 basically corresponds to the longitudinal axis of the first eccentric bush 111. Thereby, basically includes the offset of both longitudinal axles less than an offset which can be fixed by self-centering of the conical locking bolt 102. Thus, the locking bolt 102 can be driven into the bolt receptacle 112 in the final condition, as it is indicated in FIG. 4B.

In a locked position of the locking bolt 102 there is a gap between the hollow cam disc 15 and the pin 2. Hence, there is no load on the hollow cam disc 15 in the locked position.

Figure 5:
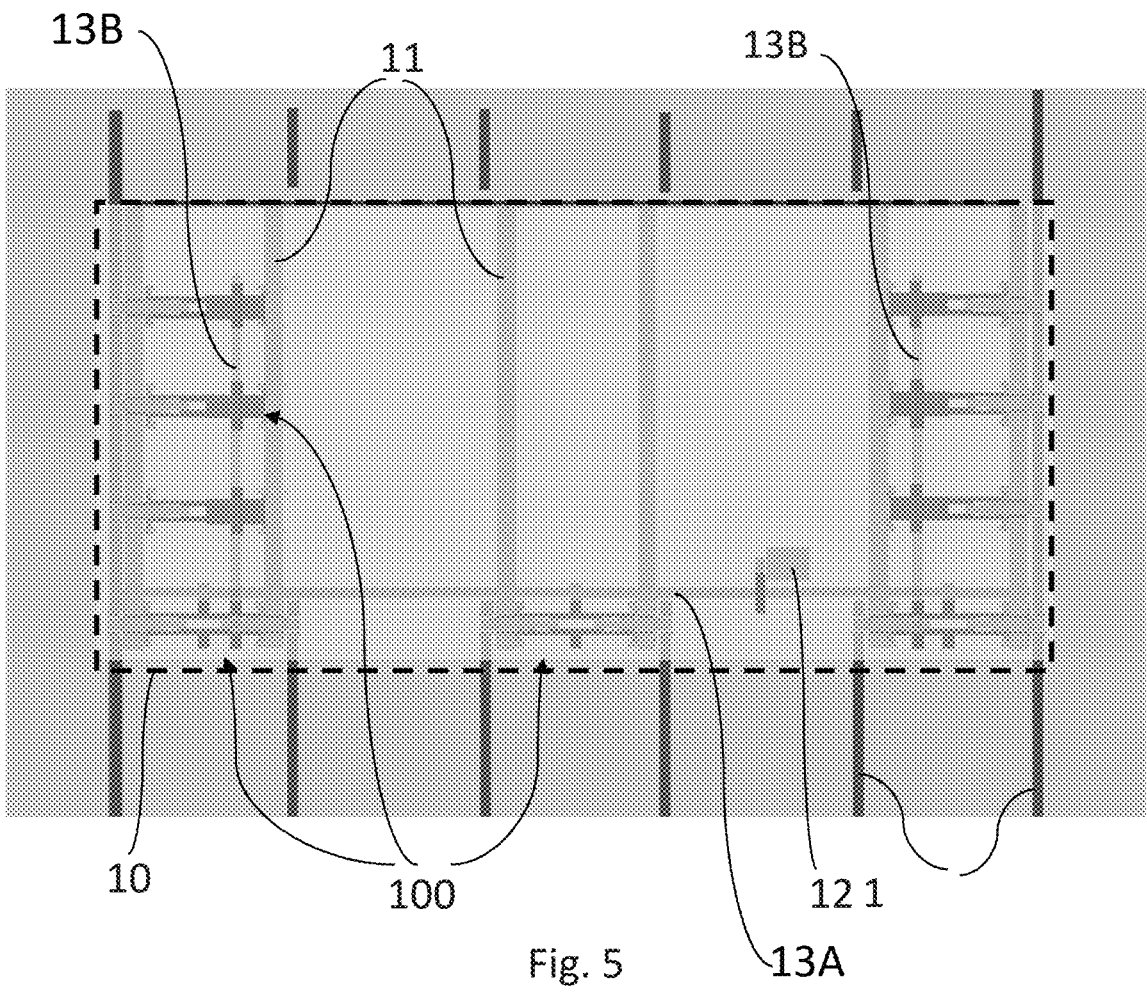
FIG. 5 shows a schematic illustration of an aircraft hatch with six hatch locking devices each having one locking bolt and with three hatch locking devices each having two locking bolts according to a further embodiment of the invention.

FIG. 5 shows a schematic illustration of an aircraft hatch 10 with six hatch locking devices 100 each having one locking bolt 102 and with three hatch locking devices 100 each having two opposing locking bolts 102.

The aircraft hatch 10 is attached by a hinge to a fuselage of an aircraft. The aircraft hatch 10 may be attached on one side of the aircraft hatch 10 to the fuselage. More particularly, the aircraft hatch 10 is attached by a multi-part hinge, and swivels outwards during the opening movement.

The six hatch locking devices 100 with one locking bolt 102 are exemplarily arranged at a lateral side of the aircraft hatch, wherein the lateral side extends along the orientation of a fuselage frame 1. The three hatch locking devices 10 with two locking bolts 102 are arranged at a horizontal side of the aircraft hatch being not the hinged side, wherein the horizontal side extends perpendicular to the orientation of the fuselage frame 1.

Further, the aircraft hatch 10 comprises a drive system 13 which mechanically couples the drive unit 12 with the hatch locking devices 100. Thereby, the drive system 13 comprises a main drive shaft 13A configured to mechanically couple the three hatch locking devices 100 with two opposing locking bolts 102. Furthermore, the drive system 13 comprises two drive belts 13B configured to mechanically couple the main drive shaft 13A with the hatch locking devices 100 with one locking bolt 102. Alternatively or additionally, the drive system 13 can comprise a worm drive for mechanically coupling the drive unit 12 to the hatch locking devices 100.

The aircraft hatch 10 and the hatch locking device 100, respectively, can transfer radial forces to align surfaces under cabin pressure. Moreover, they can transfer shear loads to stiffen a door cut-out and can transfer compressive forces along the longitudinal axis X to prevent clash.

Figure 6:
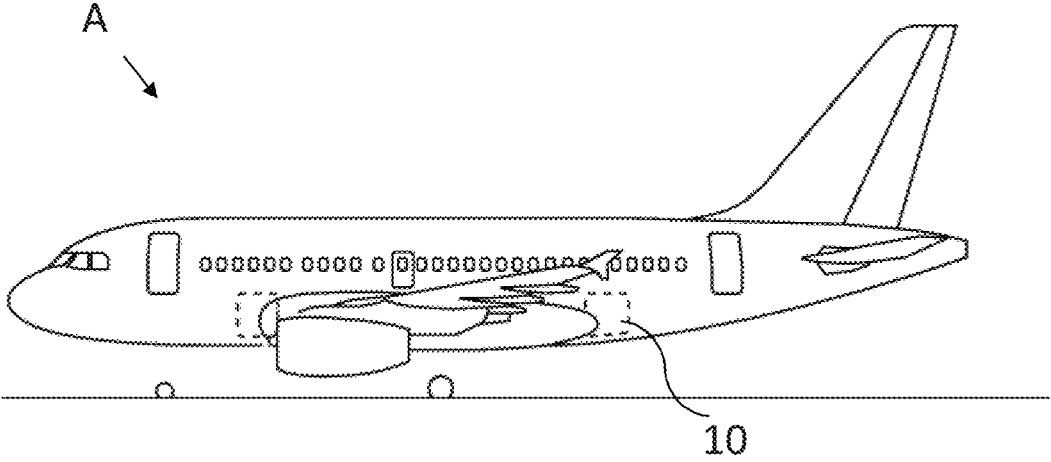
FIG. 6 shows a schematic illustration of an aircraft with an aircraft hatch comprising a hatch locking device according to a further embodiment of the invention.

FIG. 6 shows a schematic illustration of an aircraft A with an aircraft hatch 10 comprising a hatch locking device 100. Optionally, the aircraft hatch 10 is configured as a cargo hold hatch.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way. The term "or" means either or both, unless the context clearly indicates that the or is an exclusive or.

REFERENCE LIST 1 fuselage frame
2 pin
10 aircraft or spacecraft hatch
11 hatch frame
12 drive unit
13 drive system
14 pull-in device
15 hollow cam disc
16 planetary gear
100 hatch locking device
101 spindle drive
102 locking bolt
103 bolt bush
104 hatch bush
105 groove
106 bolt or pin
107 roller bearing
110 adjustment bush assembly
111 first eccentric bush
112 bolt receptacle
113 serrated plate
114 second eccentric bush
115 teeth

10

116 nut
117 shim washer
118 teeth
A aircraft or spacecraft
X longitudinal axis
Y axis
Z axis

The invention claimed is:

1. A hatch locking device for a hatch for an aircraft or a space craft, the hatch locking device comprising:
a drivable spindle drive which extends in a longitudinal axis, is fixed in relation to a hatch frame of the hatch along the longitudinal axis and has an internal chamber oriented along the longitudinal axis;
a drive unit mounted to the hatch frame and configured to drive the drivable spindle drive;
two opposing locking bolts driven by the drivable spindle drive and guided along the longitudinal axis, wherein the two opposing locking bolts are within the internal chamber of the drivable spindle device and driven by the drivable spindle drive along the longitudinal axis such that a portion of the at least one locking bolt protrudes from the internal chamber; and
two adjustment bush assemblies each mounted on the fuselage frame mounted on a fuselage frame of the aircraft or the space craft and the adjustment bush assemblies comprise:
a first bush having a bolt receptacle oriented centrally along the longitudinal axis and configured to receive the portion of a first of the two opposing locking blots such that the hatch locking device is positive-locking connectable in two axes both perpendicular to the longitudinal axis.

2. The hatch locking device according to claim 1, wherein the two adjustment bush assemblies are configured to receive the two opposing locking bolts such that the hatch locking device is positive-locking connectable in the longitudinal axis.

3. The hatch locking device according to claim 1, wherein each of the two opposing locking bolts includes an end region, and each of the end regions is encased in a bolt bush, wherein the bolt bush slides inside the drivable spindle drive to support the at least one locking bolt against a torque perpendicular to the longitudinal axis.

4. The hatch locking device according to claim 1, wherein the first of the two adjustment bush assemblies each comprises a second bush which partly surrounds an outer surface of the first bush, wherein the first bush and the second bush each have a similar axle offset.

5. The hatch locking device according to claim 4, wherein the second bush has a conical shape and comprises teeth on a front side configured to rotate the second bush in relation to the first bush, wherein the two adjustment bush assemblies further each comprise a nut interacting with the first bush and the nut is configured to press the second bush between the first bush and a fuselage frame.

6. The hatch locking device according to claim 1, wherein the two adjustment bush assemblies each further comprise a shim washer in a gap between the at least one locking bolt and the first bush along the longitudinal axis.

7. The hatch locking device according to claim 1, wherein the first bush is configured as a serrated, conical bush, and the first bush comprises teeth on a front side configured to suppress rotation of the first bush relative to the fuselage frame.

8. A hatch assembly for an aircraft or a spacecraft hatch, the hatch assembly comprising:
  a hatch frame for the aircraft or the spacecraft hatch;
  a hatch locking device mounted to the hatch frame, the hatch locking device comprising:
    a drivable spindle drive which extends in a longitudinal axis and is fixed in relation to the hatch frame along the longitudinal axis, wherein the drivable spindle device includes an internal chamber extending along the longitudinal axis;
    at least one locking bolt within the internal chamber and driven by the drivable spindle drive along the longitudinal axis, wherein a portion of the at least one locking bolt extends from the internal chamber; and
    at least one adjustment bush assembly is mounted on a fuselage frame of the aircraft or the space craft and the at least one adjustment brush comprises:
    a first bush having a bolt receptacle oriented centrally along the longitudinal axis and is configured to receive the portion of the at least one locking bolt such that the hatch locking device is positive-locking connectable in two axes both perpendicular to the longitudinal axis;
  a drive unit mounted to the hatch frame and configured to drive the drivable spindle drive, and
  a pull-in device configured to force the hatch to close, wherein the pull-in device comprises a hollow cam disc mechanically coupled to the drive system and configured to interact with a pin mounted on a fuselage frame.

9. The hatch assembly according to claim 8, further comprising at least two of the hatch locking devices, wherein at least one of the hatch locking devices comprises two opposing locking bolts and wherein at least one hatch locking device comprises a locking bolt.

10. The hatch assembly according to claim 8, further comprising a drive system which mechanically couples the drive unit with the hatch locking device, wherein the drive system comprises at least one: a main drive shaft, a drive belt or a worm drive.

11. The hatch assembly according to claim 8, wherein the pull-in device further comprises a planetary gear arranged between the hollow cam disc and the drive system and configured to synchronize rotation of the hollow cam disc with rotation of the drivable spindle drive such that the hatch is at least almost closed before the bolt receptacle receives the locking bolt.

12. An aircraft or a spacecraft including the hatch assembly according to claim 8.

13. The aircraft or the spacecraft of claim 12, wherein the hatch assembly is configured as a cargo hold hatch.

14. A hatch assembly for an aircraft or a spacecraft hatch, the hatch assembly comprising:

a first hatch frame and a second hatch frame parallel to the first hatch frame, wherein the first hatch frame includes a first aperture and the second hatch frame includes a second aperture aligned with the first aperture along a longitudinal axis;
  a drivable spindle drive aligned with the longitudinal axis and fixed to the first hatch frame and to the second hatch frame;
  a first locking bolt extending from a first end of the drivable spindle which drives the first locking bolt to move along the longitudinal axis relative to the first aperture of the first hatch frame;
  a second locking bolt extending from a second end of the drivable spindle opposite to the first end, wherein the drivable spindle drives the second locking bolt to move along the longitudinal axis relative to the second aperture of the second hatch frame;
  a first adjustment bush assembly mounted to a fuselage frame of the aircraft or the space craft, wherein the first adjustment brush includes a first bush including a first bolt receptacle aligned with the longitudinal axis and configured to receive the first locking bolt such that the hatch locking device is positive-locking connectable in two axes both perpendicular to the longitudinal axis;
  a second adjustment bush assembly mounted to the fuselage frame, wherein the first adjustment brush includes a second bush including a second bolt receptacle aligned with the longitudinal axis and configured to receive the second locking bolt such that the hatch locking device is positive-locking connectable in the two axes both perpendicular to the longitudinal axis, and
  a drive unit mounted to the hatch frame and configured to drive the drivable spindle drive to move the first locking bolt into and out of the first bolt receptacle and move the second locking bolt into and out of the second bolt receptacle.

15. The hatch assembly of claim 14, wherein the first adjustment bush assembly includes a further comprises a third bush which partly surrounds an outer surface of the first bush,
  wherein the first bush and the third bush each have a similar axle offset.

16. The hatch assembly according to claim 15, wherein the third bush has a conical shape and comprises teeth on a front side configured to rotate the third bush relative to the first bush,
  wherein the first adjustment bush assembly further comprises a nut interacting with the first bush and the nut is configured to press the third bush between the first bush and a fuselage frame.

* * * * *